No. 683,955. Patented Oct. 8, 1901.
J. M. LONGINUS.
METAL SHAPING OR CUTTING MACHINE.
(Application filed May 2, 1901.)
(No Model.) 2 Sheets—Sheet 1.

WITNESSES:

INVENTOR
Jos. M. Longinus
BY
Geo. H. Parmelee,
his ATTORNEY.

No. 683,955. Patented Oct. 8, 1901.
J. M. LONGINUS.
METAL SHAPING OR CUTTING MACHINE.
(Application filed May 2, 1901.)
(No Model.)
2 Sheets—Sheet 2.

WITNESSES:

INVENTOR
Jos. M. Longinus
BY
Geo. H. Parmelee.
his ATTORNEY.

UNITED STATES PATENT OFFICE.

JOSEPH M. LONGINUS, OF JOHNSTOWN, PENNSYLVANIA.

METAL SHAPING OR CUTTING MACHINE.

SPECIFICATION forming part of Letters Patent No. 683,955, dated October 8, 1901.

Application filed May 2, 1901. Serial No. 58,463. (No model.)

*To all whom it may concern:*

Be it known that I, JOSEPH M. LONGINUS, of Johnstown, in the county of Cambria and State of Pennsylvania, have invented a new and useful Improvement in Metal Shaping or Cutting Machines, of which the following is a full, clear, and exact description, reference being had to the accompanying drawings, which form a part of this specification.

My invention has reference to a metal shaping or cutting machine adapted to various uses, and particularly to the work of shaping and "backing off" the teeth of gear or milling cutters.

In its preferred embodiment my invention consists in a simple machine in the nature of an attachment to any ordinary planing or metal-shaping machine or other machine capable of giving it the necessary movement. This movement is of compound nature, and consists of a reciprocating motion of the cutting-tool and a correlative circular movement of the blank or other part being operated upon. In the particular machine illustrated in the accompanying drawings this movement is derived from the reciprocating ram of an ordinary planer or shaper. I also provide means for varying the length, position, and angle of stroke of the tool, and the usual adjustments of the planer or shaper may be utilized to also adjust the stroke of the tool and the correlative movement of the work.

My invention also consists in the novel construction, arrangement, and combination of parts, all as hereinafter described, and pointed out in the appended claims.

Figure 1:
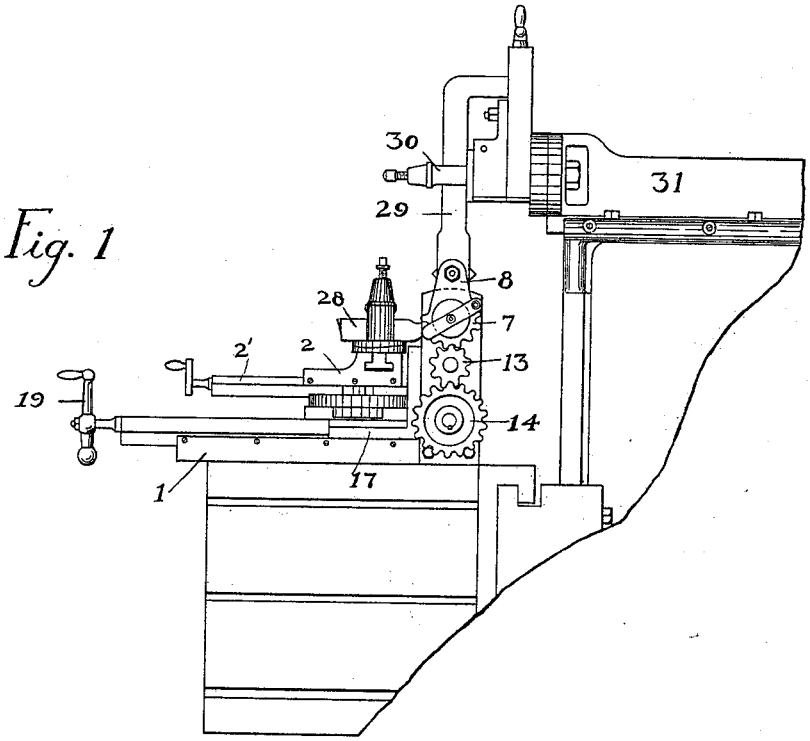
Figure 2:
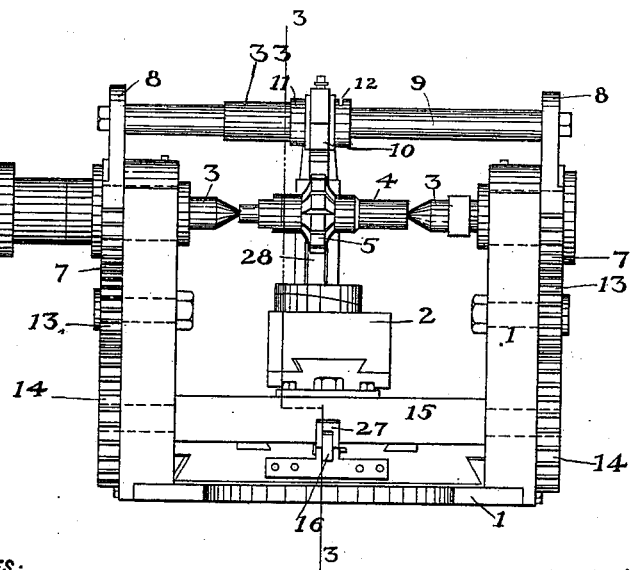
Figure 3:
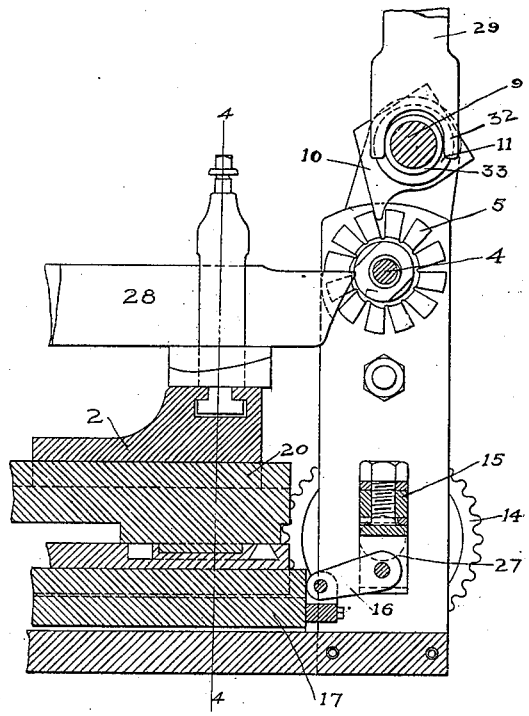
Figure 6:
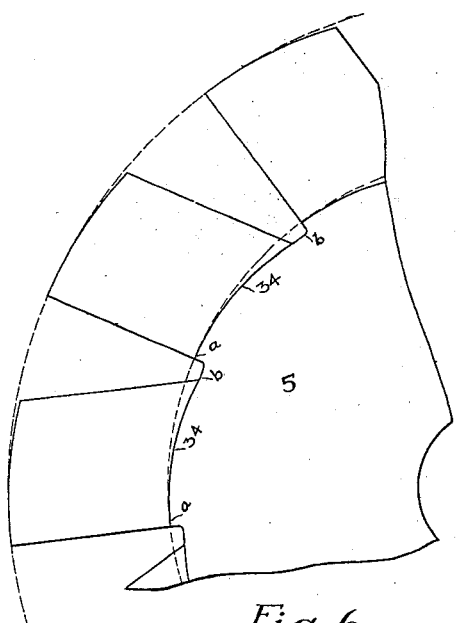
Figure 4:
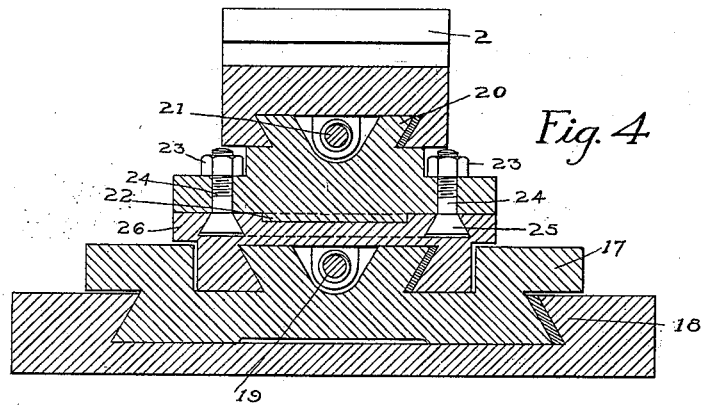
Figure 5:
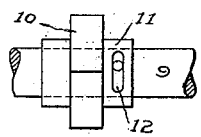

In the accompanying drawings, Figure 1 is a side elevation of a machine embodying my invention and showing also a portion of the frame and reciprocating ram of a planer or shaper to which the machine embodying the invention is attached. Fig. 2 is an end elevation of the machine; Fig. 3, a section on the line 3 3 of Fig. 2; Fig. 4, a section on the line 4 4 of Fig. 3; Fig. 5, a detail view showing the connection between the feed-dog and its shaft, and Fig. 6 a side view of a portion of a milling-cutter which illustrates the nature of the work performed.

In the drawings the numeral 1 designates the frame of the machine, consisting of a base portion, which forms a bed or support for a compound tool post or rest 2, and two upright posts in which the gearing of the machine is journaled.

3 3 designate centers of the character usually employed on lathes, which carry a short removable mandrel 4, upon which the blank 5 to be shaped or cut is temporarily fixed. One of the centers has the usual adjustment controlled by a hand-wheel 6.

7 7 designate two toothed segments which are journaled or centered one on each of the frame-posts and whose upwardly-extending arms 8 carry a transverse rod or fixed shaft 9, on the central portion of which is a sleeved dog or pawl 10, whose curved free end is adapted to engage the teeth of the blank 5, as clearly shown in Fig. 3. The sleeve 11, which carries this dog or pawl, has a pin-and-slot connection 12 (see Fig. 5) with the rod or shaft 9. The toothed segments 7 engage pinions 13, which in turn mesh with gear-wheels 14, secured to the ends of a rocker bar or shaft 15, journaled in the lower portions of the frame-posts.

16 is a short connecting bar or link connected at one end to the central portion of the bar or shaft 15 and at its other end to the base 17 of the tool post or rest 2. This tool post or rest, which is shown in section in Figs. 3 and 4, is similar to the ordinary compound tool-rest of lathes. It is adjustable as a whole in the guides 18 by means of a screw 19, and its upper portion has an independent adjustment in the guides 20 by means of a screw 21. Said upper portion is also capable of a circular adjustment on the center 22 by slacking the nuts 23 of bolts 24, whose heads engage an annular groove 25 in the member 26. The connection between the bar or link 16 and the rocker-bar 15 is made through a vertically-adjustable stirrup 27, by means of which the point of connection may be varied with respect to the axis of the rocker-bar, and thus change correspondingly the length of stroke of the tool-rest.

28 illustrates any suitable tool.

The actuating connection with the shaper-ram may be conveniently made by means of a bar 29, which is secured in the tool-clamp 30 of the shaper-ram 31 and has a forked lower portion 32, which engages the bar or shaft 9, the latter being provided with a bushing 33 to receive such engagement.

The operation is as follows: The forward stroke of the shaper-ram swings forwardly the bar or shaft 9, thereby actuating the toothed segments 7, the gears 13 and 14, and the rocker-bar 15, and through the latter effecting a horizontal movement of the tool-rest and tool toward the work. As the tool is thus moved toward the work the latter is rotated by the action of the dog 10 through an arc of proportionate length. With a blank and tool such as illustrated in the drawings the lateral faces of the teeth of the blank are caused to be cut in the manner shown in Fig. 6, the shoulders 34 at the roots of the teeth being cut on arcs $a\ b$, which are non-concentric with the axis of the blank. The corresponding clearance shape of the ends of the teeth is made in a similar manner by the use of a suitable tool. Upon the return stroke of the shaper-ram the dog 10 rides loosely back on the blank and falls in position for a new hold.

It will be understood that by means of the usual adjustments employed on planers and shapers for varying the stroke of the ram the stroke of the tool and the corresponding movement of the blank may be adjusted as may be necessary; also, that by varying the point of connection of the connecting bar or link 16 with the rocker 15 the length of stroke of the tool may be varied without changing the movement of the blank. By means of the screws 19 and 21 the position of the tool-stroke may be varied at will without changing the length of the stroke, and the nuts 23 may be slacked and the tool-post given any desired angular adjustment for special kinds of work.

It will of course be understood that a variety of tools suited to the particular work in hand may be used.

When the machine is not desired to be used, it can be readily detached and removed from the planer or shaper.

While, as herein shown, I prefer to construct the machine in the nature of an attachment for a shaper or planer, lathe, or other machines from which the necessary motion may be derived, it is obvious that it may be independently constructed and driven by connection with any suitable source of power. Various changes may also be made in the construction and arrangement of the several parts of the machine without departing from the spirit of the invention, and hence I do not wish to be limited to the exact construction, combination, and arrangement of parts which I have herein shown and described.

Having thus described my invention, what I claim as new, and desire to secure by Letters Patent, is—

1. In a machine of the character described, the combination of centers for supporting the work, an oscillating feeder mechanism for periodically giving a circular movement to the work, a reciprocating tool-rest and tool, and mechanism for effecting a forward movement of said rest and tool coincidently with the circular movement of the work.

2. In a machine for the purpose described, the combination of centers for supporting the work, an oscillating feeder mechanism arranged to give an intermittent circular movement to the work, a reciprocating tool-rest and tool, and mechanism deriving its motion from the said feeder mechanism for effecting a forward movement of the tool-rest and tool coincidently with the circular movement of the work.

3. In a machine of the character described, the combination with centers for supporting the work, and oscillating feeder mechanism for intermittently rotating the work on the centers, of a reciprocating tool-rest, and connections between said rest and the feeder mechanism for giving a forward movement to the tool-rest coincidently with the movement of the work, and means for adjusting the length of such forward movement.

4. In a machine of the character described, the combination with centers for supporting the work, and oscillating feeder mechanism for intermittently rotating the work on the centers, of a reciprocating tool-rest, and connections between said rest and the feeder mechanism for giving a forward movement to the tool-rest coincidently with the movement of the work, and means for adjusting the position of such forward movement.

5. In a machine of the character described, the combination with centers for supporting the work, and oscillating feeder mechanism for intermittently rotating the work on the centers, of a reciprocating tool-rest and connections between said rest and the feeder mechanism for giving a forward movement to the tool-rest coincidently with the movement of the work, and means for adjusting the angle of position of the tool-rest.

6. In a machine of the character described, the combination with centers for supporting the work, and oscillating feeder mechanism for intermittently rotating the work on the centers, of a reciprocating tool-rest, and connections between said rest and the feeder mechanism for giving a forward movement to the tool-rest coincidently with the movement of the work, and means for adjusting separately the length and position of such forward movement, and also the angular position of the tool-rest.

7. In a machine for the purpose described, the combination of a pair of centers for carrying the work, oscillating feeder devices for imparting an intermittent rotary motion to the work, means for actuating said devices and for varying the movement thereof, a reciprocating tool-rest, and a connection between said rest and the feeder devices, where- 8. In a machine for the purpose described, the combination of a supporting-frame, a pair of toothed segments journaled thereto, a transverse bar or shaft carried by arms of said segments, work-supporting centers below the said bar or shaft, a pawl or dog on said bar or shaft adapted to engage the work carried on said centers, a reciprocating tool-rest, and means actuated by said segments for actuating said rest.

9. In a machine for the purpose described, the combination of a supporting-frame, a pair of toothed segments journaled thereto, a transverse bar or shaft carried by arms of said segments, work-supporting centers below the said bar or shaft, a pawl or dog on said bar or shaft arranged to engage the work carried on said centers, means for oscillating the said segments, a horizontally-reciprocating tool-rest, a rocker for actuating said rest, and gear connections between said rocker and the toothed segments.

10. In a machine for the purpose described, the combination with a pair of work-supporting centers, of an oscillating dog or pawl for imparting an intermittent circular movement to the work carried by said centers, a reciprocating compound tool-rest, and means for actuating said rest so that its working stroke is coincident with the circular movement of the work.

11. In a machine of the character described, the combination with a reciprocating compound tool-rest having the usual adjustments common to such rests, of a rotatable work-support, an oscillating pawl or dog arranged to give the work an intermittent circular movement, and means for reciprocating the tool-rest so that its working stroke is coincident with the circular movement of the work.

12. In a machine of the character described, the combination of a pair of work-supporting centers, an oscillating frame carrying a dog or pawl arranged to engage and intermittently rotate the work carried on said centers, means for actuating the said frame, a reciprocating tool-rest, a rocker for actuating said rest, and operative connections between said frame and rocker.

13. In a machine of the character described, the combination of the work-supporting centers, the toothed segments, the oscillating frame carried thereby, the pawl or dog carried by said frame, a horizontally-reciprocating tool-rest, a rocker, an adjustable connection between the rocker and tool-rest, and gears connecting the rocker with the said segments.

14. The combination with a planing or shaping machine, having a reciprocating ram, of an attachment therefor consisting of a pair of work-supporting centers, a bar arranged to oscillate about said centers, an actuating detachable connection between said bar and the ram of the planer or shaper, a pawl or dog on said bar arranged to engage the work carried by said centers, a tool-rest arranged to reciprocate toward and away from the said centers, and an actuating connection between the tool-rest and the said oscillating bar.

15. In a machine of the character described, the combination of a supporting-frame, work-carrying centers mounted in said frame, a transverse bar arranged to oscillate about said centers, a pawl or dog on said bar arranged to engage and intermittently rotate the work carried by said centers, a reciprocating tool-rest, a rocker for actuating the said tool-rest, gear connections between said rocker and the oscillating bar, and an actuating connection between said bar and the reciprocating ram of a planer, shaper, or other like machine.

In testimony whereof I have affixed my signature in presence of two witnesses.

JOS. M. LONGINUS.

Witnesses:
CORA G. COX,
H. W. SMITH.